United States Patent [19]

Dean et al.

[11] 3,838,281

[45] Sept. 24, 1974

[54] AIRCRAFT ICE DETECTION EQUIPMENT WITH CORRECTION FOR SEVERE CONDITIONS

[75] Inventors: Michael Gordon Ellis Dean, Luton; John Raymond Keen, Kempston; Geoffrey Edgington, Godalming, all of England

[73] Assignee: Lucas Aerospace Limited, Birmingham, England

[22] Filed: Apr. 11, 1973

[21] Appl. No.: 350,137

[30] Foreign Application Priority Data

Apr. 26, 1972 Great Britain .................... 19272/72

[52] U.S. Cl. ................................ 250/308, 250/358

[51] Int. Cl. ........................................ G01n 23/06

[58] Field of Search ............................ 250/308, 358

[56] References Cited

UNITED STATES PATENTS

| | | | |
|---|---|---|---|
| 3,116,395 | 12/1963 | Byrne et al. | 250/308 |
| 3,239,668 | 3/1966 | Goldman et al. | 250/308 |
| 3,648,035 | 3/1972 | Hart et al. | 250/358 X |
| 3,668,401 | 6/1972 | Shah et al. | 250/308 X |

*Primary Examiner*—Archie R. Borchelt
*Attorney, Agent, or Firm*—Holman & Stern

[57] ABSTRACT

Ice detection equipment comprises electrical circuit means for effecting a count of a number of electrical pulses means for modifying the count depending upon the rate of production of the pulses.

4 Claims, 1 Drawing Figure

POWER SUPPLY SWITCH 23; LATCH; ICE SEVERITY REGISTER 16; INHIBIT 24; INDICATING LAMP 25; LOGIC CIRCUIT 27; MEMORY STORE 30; MEMORY DECODER 26; ICE SEVERITY INDICATOR 31; PULSE GENERATOR 18; GATE 19; 20; CRITICAL SURFACE 2; HEATER 3; MONOSTABLE 15; RE-SET PULSE GENERATOR 21; DECODER 29; COMPARATOR 28; RELAY 37; REGISTER RE-SET 38; GATE 33; LATCH 36; FILTER 10; PULSE SHAPER 11; REGISTER RE-SET 12; LOGIC CIRCUIT 32; RADIOACTIVE SOURCE 9; COUNTER TUBE 8; AEROFOIL SECTION 7; ICE ACCRETION INDICATOR 34; DIFFERENTIAL AMPLIFIER 6; COUNT TRANSFER PULSE GENERATOR 14; CORRECTION PULSE GENERATING CIRCUIT 17; ICE ACCRETION REGISTER 22; DECODER 33a; RELAY 4; FREQUENCY DISCRIMINATOR 5; STORE CLEAR PULSE GENERATOR 13; MONOSTABLE 35

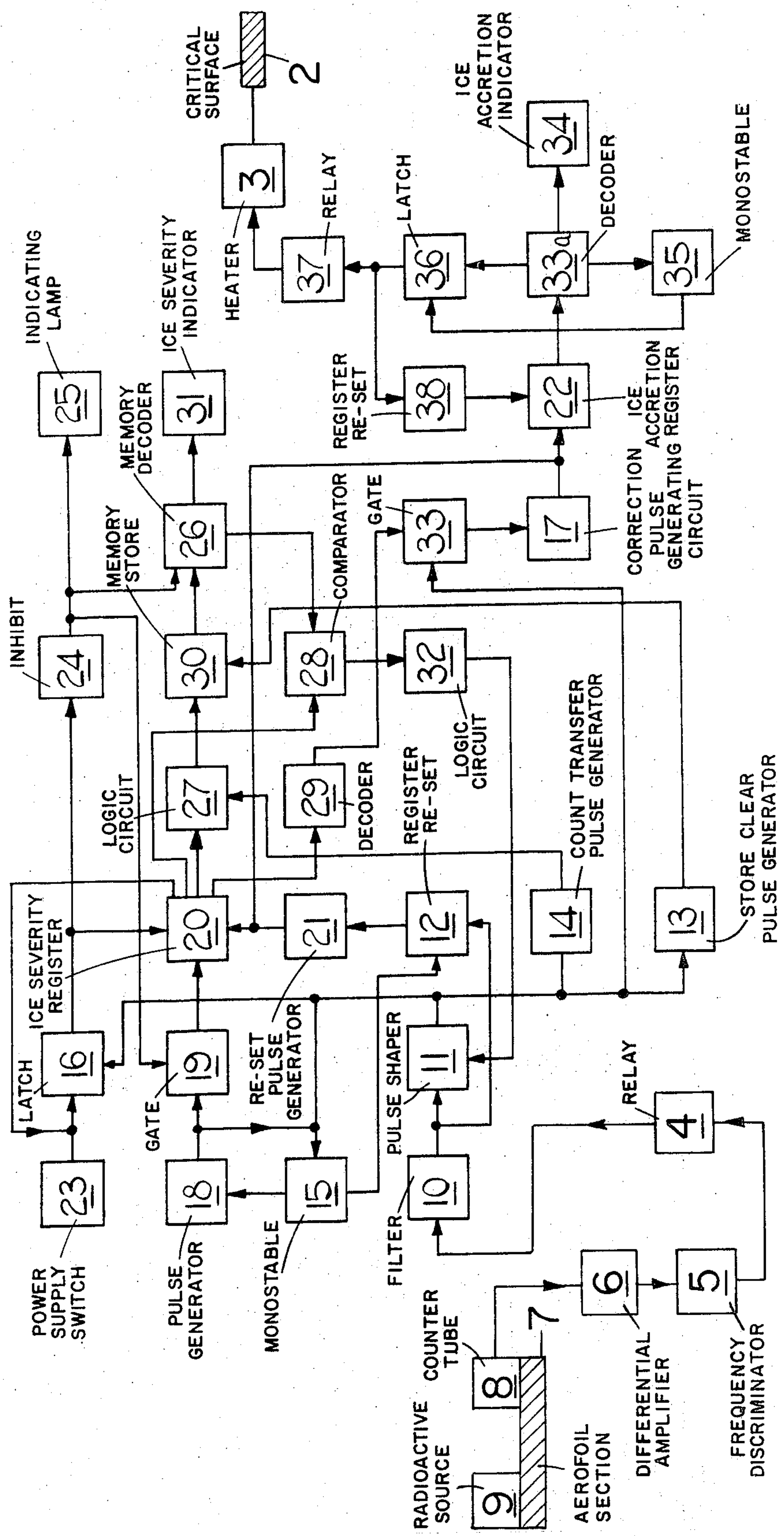

CRITICAL SURFACE
HEATER
RELAY
LATCH
ICE ACCRETION INDICATOR
DECODER
MONOSTABLE
INDICATING LAMP
ICE SEVERITY INDICATOR
MEMORY DECODER
REGISTER RE-SET
ICE ACCRETION REGISTER
MEMORY STORE
COMPARATOR
GATE
CORRECTION PULSE GENERATING CIRCUIT
INHIBIT
LOGIC CIRCUIT
DECODER
REGISTER RE-SET
LOGIC CIRCUIT
COUNT TRANSFER PULSE GENERATOR
STORE CLEAR PULSE GENERATOR
ICE SEVERITY REGISTER
LATCH
GATE
RE-SET PULSE GENERATOR
PULSE SHAPER
RELAY
POWER SUPPLY SWITCH
PULSE GENERATOR
MONOSTABLE
FILTER
COUNTER TUBE
RADIOACTIVE SOURCE
AEROFOIL SECTION
DIFFERENTIAL AMPLIFIER
FREQUENCY DISCRIMINATOR

AIRCRAFT ICE DETECTION EQUIPMENT WITH CORRECTION FOR SEVERE CONDITIONS

This invention relates to ice detection equipment, and more particularly but not exclusively to such equipment for use in conjunction with apparatus for de-icing aircraft surfaces. It is an object of the invention to provide ice detection equipment in a convenient form.

In accordance with the present invention there is provided ice detection equipment comprising first means for effecting a count of a number of electrical pulses produced in use by an ice detector and second means for modifying said count depending upon the rate of production of said pulses.

Preferably, said second means includes third means for producing an indication of a number of said pulses produced in a given time interval and fourth means for modifying the count in said first means in accordance with the indication produced by said third means.

Preferably, said ice detection equipment further comprises means for initiating a de-icing cycle when the count is said first means reaches a predetermined value.

The invention will now be more particularly described with reference to the accompanying drawing which is a block diagram of an electrical circuit forming one embodiment of ice detection equipment constructed in accordance with the present invention.

Referring to the drawing, the ice detection equipment shown therein is intended, in particular, for use in conjunction with apparatus for de-icing aircraft surfaces, and more particularly for mounting on the body of a helicopter and serving to detect ice forming on the rotor blades of the helicopter. A surface such as the rotor blade, on which the formation of ice is critical, is shown in the drawing at 2. The ice detection equipment includes a filter 10 which receives at its input a signal which indicates the build up of a predetermined thickness of ice on a transducer. The transducer is conveniently a radio active source 9 arranged in spaced apart relationship with a Geiger-Muller counter tube 8 such that radiation emitted by said radio active source 9 passes close to and in a direction parallel to the surface of an aerofoil section 7 of the aircraft. The effect of the presence of ice between the radio active source and the Geiger-Muller counter tube 8 will be to decrease the output signal frequency from said counter tube 8 and this output signal is fed through a differential operational amplifier 6 to a frequency discriminator 5 the output of which is utilized to operate a relay 4 when the signal is such as to indicate a predetermined build up of ice (for example 0.015 inches - 0.020 inches thickness) between the radio active source and the Geiger-Muller counter tube. Upon operation the relay produces a voltage pulse of approximately 8 to 12 seconds duration and this pulse is fed to said input of the filter 10 and at the same time de-icing of the aerofoil section 7 spaced between the radio active source and the Geiger-Muller counter tube is effected and this normally takes 8 to 12 seconds depending upon the ambient temperature conditions.

The filter 10 removes any extraneous noise from the pulses fed into the input of the filter and the output of the filter 10 is connected, on the one hand to an input of a pulse shaping circuit 11 and on the other hand to an input of a register re-set switch 12. The output of the pulse shaping circuit 11 is connected to an input of a store clear pulse generator 13, an input of a count transfer pulse generator 14, an input of a pulse generator re-set monostable 15, an input of a register stand by latch 16 and an input of a gate 33. One output of the pulse generator re-set monostable 15 is connected to a further input of the register re-set switch 12 whilst a further output of the pulse generator re-set monostable 15 is connected to the input of a timing pulse generator 18. The output of the timing pulse generator 18 is connected on the one hand to the aforesaid input of the pulse generator re-set monostable 15 and on the other hand to an input of a gate 19 the output of which is connected to an input of an ice severity register 20 associated with the register re-set switch 12. The output of the latter is connected to an input of a register re-set pulse generator 21 the output of which is connected on the one hand to a further input of the ice severity register 20 and on the other hand to an input of an ice accretion register 22. A power supply switch 23 is connected to a further input of the register standby latch the output of which is connected on the one hand to yet a further input of the ice severity register 20 and on the other hand to an input of an inhibit 24. The output of the inhibit is connected to an indicating lamp 25, a further input of the gate 19, and an input of a memory decoder 26. The ice severity register 20 has four outputs one of which is connected to the further input of the register standby latch 16, the second one of which is connected to an input of a transfer logic circuit 27, a third one of which is connected to an input of a comparator 28 and a fourth one of which is connected to an input of a decoder 29. The output of the transfer logic circuit 27 is connected to one input of a memory store 30, a further input of which is connected to the output of the store clear pulse generator 13. The output of the memory store 30 is connected to a further input of the memory decoder 26, one output of which is connected to an input of an icing severity indicator 31 and another output of which is connected to a second input of the comparator 28. The output of the count transfer pulse generator 14 is connected to a second input of the transfer logic circuit 27 and the output of the comparator 28 is connected to an input of an updating logic circuit 32 the output of which is connected to a further input of the pulse shaping circuit 11. The output of the decoder 29 is connected to a further input of the gate 33 the output of which is connected to an input of a correction pulse generating circuit 17. The output of the latter is connected to the aforesaid input of the ice accretion register 22 the output of which is connected to an input of a decoder 33*a*. The latter has three outputs, one of which is connected to an input of an ice accretion indicator 34, another of which is connected to an input of a pulse shaping monostable circuit 35 and the remaining output of which is connected to an input of a latch 36. The output of the pulse shaping monostable circuit 35 is connected to a further input of the latch 36, the output of which is connected on the one hand to an input of a relay 37 and on the other hand to an input of a register re-set 38 the output of which is connected to a further input of the ice accretion register 22. The output of the relay 37 is either arranged to energize de-icing apparatus associated with the aircraft or alternatively it is arranged to provide a cumulative count of the ice accreted on the aerofoil surface of the aircraft.

The ice detection equipment hereinbefore described performs two functions, namely it provides an indication of the severity of icing that is to say it measures the rate at which icing takes place, and it provides an indication of the total ice accreted, or where de-icing apparatus is being used in conjunction with the ice detection equipment, then it measures the ice accretion count since the last de-icing cycle. In general, the indication of the severity of icing employs the principle of measuring the number of pulses produced at the input of the filter 10 in seven equal time intervals each of which is determined by the timing pulse generator 18 and each of which may be in the order of 25 seconds, but of course, this time interval may be varied depending, inter alia on the type of aircraft on which the de-icing equipment is used. Furthermore, the measurement of the total ice accreted is made by modifying the total number of pulses received at the input of the filter 10, such modification depending upon the severity of icing.

More paticularly, the de-icing equipment operates as follows.

During normal flight, that is to say when no icing takes place, the de-icing equipment is held in a standby condition by the register standby latch 16. This standby latch 16 is set by two conditions. Firstly the latch 16 can be set by switching on the power supply at 23 and secondly at the completion of an icing encounter (namely, when, after receipt of an icing signal or signals, no further signals have been received for a predetermined time) through the first mentioned output of the ice severity register 20. The standby latch 16 holds the ice severity register 20 at a zero reading and via the inhibit 24 and gate 19 it blocks the output of the timing pulse generator 18 while it also via the inhibit 24 blocks the output on the memory decoder 26 to the icing severity indicator 31.

The ice accretion register 22 is self zeroing when the power supply is switched on. Moreover, after the power supply 23 has been switched on but before a pulse is received at the input of the filter 10 the icing severity indicator 31 will show a zero reading, the indicating lamp 25 will not be energised and the ice accretion cumulative count will be zero.

When the first pulse is received at the input of the filter 10 this pulse will be filtered and subsequently shaped by the shaping circuit 11. The pulse received will then initiate the following actions which occur in sequence controlled by inbuilt delay functions within the de-icing equipment. Firstly this pulse triggers the pulse generator re-set monostable 15 which serves to discharge a timing capacitor of the timing pulse generator 18. Secondly, it breaks the register standby latch 16 which in turn opens the gate 19, removes the inhibit from the memory decoder 26 and frees the ice severity register 20 to count. Thirdly, it trips the store clear pulse generator 13 which clears the store 30. Fourthly it trips the count transfer pulse generator 14 which causes the transfer logic circuit 27 to transfer the count in the ice severity register 20 to the store. Fifthly, after completion of a delay imposed by the pulse generator re-set monostable 15 on the register re-set switch 12, it triggers the register re-set pulse generator 21 and sets the ice severity register, which is a three bit register to 001. Finally, the register re-set pulse generator 21 clocks a pulse into the ice accretion register 22.

The indicating lamp 25 will be energised via the latch 16 and inhibit 24 and moreover the icing severity indicator 31 will exhibit a minimum reading while the ice accretion indicator 34 will exhibit a count of 1. The ice severity register 20 will then count timing pulses produced by the timing pulse generator 18. If there is no further pulse received at the input of the filter 10 during seven timing pulses then since the ice severity register 20 is only a three-bit register it will count into a standby condition and re-set the register standby latch 16 as hereinbefore described. The indicating lamp 25 will then be de-energised, the gate 19 will block the output from the timing pulse generator 18 and the output of the memory decoder 26 to the icing severity indicator 31 will be blocked.

However, where a further ice detection pulse is received at the input of the filter 10 during the aforesaid seven timing pulses produced by the timing pulse generator 18 then this further pulse will trigger the pulse generator re-set monostable 15 which causes the aforesaid timing capacitor of the timing pulse generator 18 to discharge. Moreover this further ice detection pulse will cause the store clear pulse generator 13 to clear the store 30 and the count transfer pulse generator 14 will cause the transfer logic circuit 27 to transfer the count in the ice severity register 20 to the memory store 30. After completion of a delay imposed as aforesaid by the pulse generator re-set monostable 15 on the register re-set switch 12, it triggers the register re-set pulse generator 21 and sets the ice severity register, which is a three-bit register to 001. Finally, the register re-set pulse generator 21 clocks a pulse into the ice accretion register 22.

Taking by way of example the case where the further ice detection pulse occurs after only one timing pulse has been produced by the timing pulse generator 18, that is to say when the ice severity register reads 010, then after the completion of the delay imposed by the pulse generator re-set monostable 15 on the register re-set switch 12 the aforesaid further pulse will trigger the register re-set pulse generator 13 to thereby re-set the ice severity register 20. The gate 33 which is opened by the decoder 29 will allow a correction pulse to be passed by the correction pulse generator circuit 17 to the ice accretion register 22 to thereby clock the latter. The register standby latch 16 will not be re-set and therefore the indicating lamp 25 will remain energised. Thus, the aforesaid correction pulse is passed to the ice accretion register by the gate 33 if for example a further ice detection pulse appears whilst the ice severity register 20 reads less than three. This indicates that the rate of icing is severe and in such conditions of severe icing it will be appreciated that the time during which the surface of the aerofoil section between the radio active source and the Geiger-Muller counter tube is being de-iced, will cause an inaccurate reading of the total ice accreted. Thus under the aforesaid severe icing conditions a correction pulse is fed to the ice accretion register 22 so that the aforesaid further ice detection pulse will cause the cumulative count of the ice accreted to increase by two counts. Thus, by modifying the count in this way a more accurate assessment can be obtained of the total ice accumulated on the aircraft surfaces. If the aforesaid further ice detection pulse does occur whilst the ice severity register contains a count equal or less than two then the icing severity indicator 31 will indicate that the rate of icing is severe. However, if the aforesaid further pulse occurs whilst the ice severity register 20 indicates a count of three then the icing severity indicator 31 may indicate that the rate of icing is medium and if the further pulse occurs whilst the ice severity register 20 indicates a count of four, five, six or seven then the icing severity indicator 31 may indicate that the rate of icing is light.

Now, assuming that the icing severity indicator 31 indicates heavy icing conditions and the memory store by way of example holds a count of 010, then if the ice severity register 20 takes up a count of 011 before yet a further ice detection pulse is received at the input of the filter 10 then the gate 33 will be closed and will not allow a correction pulse to be passed by the correction pulse generator 17 to the ice accretion register 22. Furthermore, the comparator 28 will act to trip the updating logic circuit 32 which will thence generate a pulse. This pulse will be fed into the pulse shaping circuit 11, the resulting output of which will operate the store clear pulse generator 13 to clear the memory store 30. Moreover, the resulting output of the pulse shaping circuit 11 will trigger the count transfer pulse generator 14 after a short delay and the pulse generator 14 will cause the transfer logic circuit 27 to transfer the count from the ice severity register 20 to the store 30. For example as the register 20 is clocked to 011 with the store 30 at 010 the updating logic circuit 32 will operate and the store 30 will take up the count 011. Therefore, the icing severity indicator 31 will give a medium reading.

Instead of providing a signal to a cumulative counter from the output of the relay 37 this relay may be used to initiate the energisation of heating apparatus 3 for de-icing the surfaces 2 of the aircraft. When the relay 37 is used for this purpose the de-coder **33*a* is programmed to trip the latch 36 at a predetermined count in the ice accretion register 22. The duration of the initiating pulse to the relay 37 is controlled by the pulse shaping monostable circuit 35 and the register 22 will be re-set when the latch 36** trips.

We claim:

1. Ice detection equipment for an aircraft having a surface on which ice formation is critical, comprising in combination an ice measuring transducer having a control surface on which ice forms together with means producing an output pulse each time the thickness of ice on said surface reaches a predetermined level, control means operable by said pulse and serving on receipt of a pulse to de-ice said control surface for a predetermined time, an accretion indicator for indicating the total thickness of ice formed on said aircraft surface, said accretion indicator being coupled to said control means, each pulse received by the control means increasing the reading of the accretion indicator, and timing means operable to produce a correcting output if the control means receives a pulse from the transducer within a set time following de-icing of said control surface, said timing means being coupled to said accretion indicator and each correcting output increasing the reading of the accretion indicator.

2. Ice detection equipment as claimed in claim 1 in which said timing means comprises a digital counter coupled to the control means and serving on receipt of a pulse from the transducer to count a predetermined number and then re-set and latch until a further pulse is received from the transducer, the timing means further including a sensor which monitors the reading in said counter and, if the reading is below a set level when the next pulse is received from the transducer, provided said correcting output to the accretion indicator.

3. Ice detection equipment as claimed in claim 2, including an ice severity indicator, and a decoder coupling said ice severity indicator to the counter, said indicator assuming a reading determined by the reading in the counter when the next pulse is received from the transducer.

4. Ice detection equipment as claimed in claim 1 including heating means operable when the reading of the accretion indicator reaches a predetermined value for de-icing said aircraft surface.

* * * * *